United States Patent

Puttichaem et al.

(10) Patent No.: US 9,105,282 B1
(45) Date of Patent: Aug. 11, 2015

(54) HEAD GIMBAL ASSEMBLY CARRIER WITH ADJUSTABLE PROTECTIVE BAR

(71) Applicant: Western Digital Technologies, Inc., Irvine, CA (US)

(72) Inventors: Wachira Puttichaem, Muang (TH); Udom Konyong, Muang (TH)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/303,481

(22) Filed: Jun. 12, 2014

Related U.S. Application Data

(62) Division of application No. 13/898,262, filed on May 20, 2013, now Pat. No. 8,770,463.

(51) Int. Cl.
*B23K 31/02* (2006.01)
*G11B 5/127* (2006.01)
*B23K 1/00* (2006.01)

(52) U.S. Cl.
CPC ............ *G11B 5/1272* (2013.01); *B23K 1/0016* (2013.01)

(58) Field of Classification Search
None
See application file for complete search history.

(56) References Cited

U.S. PATENT DOCUMENTS

| | | | |
|---|---|---|---|
| 4,787,550 A | 11/1988 | Masuda et al. | |
| 5,844,420 A * | 12/1998 | Weber et al. | 324/754.03 |
| 6,075,673 A | 6/2000 | Wilde et al. | |
| 6,097,575 A | 8/2000 | Trang et al. | |
| 6,125,014 A | 9/2000 | Riedlin, Jr. | |
| 6,125,015 A | 9/2000 | Carlson et al. | |
| 6,130,863 A | 10/2000 | Wang et al. | |
| 6,137,656 A | 10/2000 | Levi et al. | |
| 6,144,528 A | 11/2000 | Anaya-Dufresne et al. | |
| 6,147,838 A | 11/2000 | Chang et al. | |
| 6,151,196 A | 11/2000 | Carlson et al. | |
| 6,178,064 B1 | 1/2001 | Chang et al. | |
| 6,181,522 B1 | 1/2001 | Carlson | |
| 6,181,673 B1 | 1/2001 | Wilde et al. | |
| 6,229,672 B1 | 5/2001 | Lee et al. | |
| 6,236,543 B1 | 5/2001 | Han et al. | |
| 6,241,141 B1 | 6/2001 | Al-Nabulsi | |
| 6,246,547 B1 | 6/2001 | Bozorgi et al. | |
| 6,249,404 B1 | 6/2001 | Doundakov et al. | |
| 6,330,131 B1 | 12/2001 | Nepela et al. | |
| 6,339,518 B1 | 1/2002 | Chang et al. | |
| 6,349,017 B1 | 2/2002 | Schott | |
| 6,373,660 B1 | 4/2002 | Lam et al. | |
| 6,378,195 B1 | 4/2002 | Carlson | |
| 6,522,504 B1 | 2/2003 | Casey | |
| 6,538,850 B1 | 3/2003 | Hadian et al. | |
| 6,543,677 B2 | 4/2003 | Pattanaik et al. | |
| 6,583,953 B1 | 6/2003 | Han et al. | |
| 6,646,832 B2 | 11/2003 | Anaya-Dufresne et al. | |

(Continued)

OTHER PUBLICATIONS

Notice of Allowance dated Apr. 11, 2014 from U.S. Appl. No. 13/898,262, 6 pages.

(Continued)

*Primary Examiner* — Kiley Stoner

(57) ABSTRACT

A method, related to manufacturing of head gimbal assembly (HGA) including the steps of soldering a first component on a HGA, while the HGA is mounted on an HGA mounting member and while a protective carrier bar of the HGA carrier is in a first position. The method further includes the steps of moving the protective carrier bar to a second position, and soldering a second component on the HGA while the protective carrier bar is in the second position.

8 Claims, 8 Drawing Sheets

(56) References Cited

U.S. PATENT DOCUMENTS

| | | |
|---|---|---|
| 6,661,612 B1 | 12/2003 | Peng |
| 6,665,146 B2 | 12/2003 | Hawwa et al. |
| 6,690,545 B1 | 2/2004 | Chang et al. |
| 6,704,173 B1 | 3/2004 | Lam et al. |
| 6,708,389 B1 | 3/2004 | Carlson et al. |
| 6,717,773 B2 | 4/2004 | Hawwa et al. |
| 6,721,142 B1 | 4/2004 | Meyer et al. |
| 6,744,599 B1 | 6/2004 | Peng et al. |
| 6,771,468 B1 | 8/2004 | Levi et al. |
| 6,796,018 B1 | 9/2004 | Thornton |
| 6,801,402 B1 | 10/2004 | Subrahmanyam et al. |
| 6,829,818 B2 * | 12/2004 | Kamigama et al. ......... 29/603.06 |
| 6,856,489 B2 | 2/2005 | Hawwa et al. |
| 6,873,496 B1 | 3/2005 | Sun et al. |
| 6,912,103 B1 | 6/2005 | Peng et al. |
| 6,937,439 B1 | 8/2005 | Chang et al. |
| 6,956,718 B1 | 10/2005 | Kulkarni et al. |
| 6,972,930 B1 | 12/2005 | Tang et al. |
| 7,006,330 B1 | 2/2006 | Subrahmanyam et al. |
| 7,006,331 B1 | 2/2006 | Subrahmanyam et al. |
| 7,010,847 B1 | 3/2006 | Hadian et al. |
| 7,019,945 B1 | 3/2006 | Peng et al. |
| 7,027,264 B1 | 4/2006 | Subrahmanyam et al. |
| 7,051,424 B2 | 5/2006 | Yao et al. |
| 7,085,104 B1 | 8/2006 | Hadian et al. |
| 7,099,117 B1 | 8/2006 | Subrahmanyam et al. |
| 7,164,097 B2 | 1/2007 | Shindo et al. |
| 7,174,622 B2 | 2/2007 | Meyer et al. |
| 7,276,673 B2 | 10/2007 | Shindo et al. |
| 7,289,299 B1 | 10/2007 | Sun et al. |
| 7,307,816 B1 | 12/2007 | Thornton et al. |
| 7,315,435 B1 | 1/2008 | Pan |
| 7,315,436 B1 | 1/2008 | Sanchez |
| 7,400,470 B2 | 7/2008 | Matsumoto et al. |
| 7,414,814 B1 | 8/2008 | Pan |
| 7,436,631 B1 | 10/2008 | Fanslau, Jr. et al. |
| 7,474,508 B1 | 1/2009 | Li et al. |
| 7,477,486 B1 | 1/2009 | Sun et al. |
| 7,486,480 B2 | 2/2009 | Satoh et al. |
| 7,591,406 B2 | 9/2009 | Wagoh et al. |
| 7,593,190 B1 | 9/2009 | Thornton et al. |
| 7,595,963 B1 | 9/2009 | Chen et al. |
| 7,616,405 B2 | 11/2009 | Hu et al. |
| 7,729,089 B1 | 6/2010 | Hogan |
| 7,765,678 B2 | 8/2010 | Yamaguchi et al. |
| 7,995,310 B1 | 8/2011 | Pan |
| 8,081,400 B1 | 12/2011 | Hu |
| 8,087,973 B1 | 1/2012 | Sladek et al. |
| 8,089,730 B1 | 1/2012 | Pan et al. |
| 8,136,805 B1 | 3/2012 | Lee |
| 8,164,858 B1 | 4/2012 | Moravec et al. |
| 8,199,437 B1 | 6/2012 | Sun et al. |
| 8,208,224 B1 | 6/2012 | Teo et al. |
| 8,218,268 B1 | 7/2012 | Pan |
| 8,240,025 B2 | 8/2012 | Shimazawa et al. |
| 8,240,545 B1 | 8/2012 | Wang et al. |
| 8,248,892 B2 | 8/2012 | Shimazawa et al. |
| 8,250,737 B2 | 8/2012 | Shimazawa et al. |
| 8,256,272 B1 | 9/2012 | Roajanasiri et al. |
| 8,295,012 B1 | 10/2012 | Tian et al. |
| 8,295,013 B1 | 10/2012 | Pan et al. |
| 8,295,014 B1 | 10/2012 | Teo et al. |
| 8,320,084 B1 | 11/2012 | Shum et al. |
| 8,325,446 B1 | 12/2012 | Liu et al. |
| 8,325,447 B1 | 12/2012 | Pan |
| 8,339,742 B1 | 12/2012 | Sladek et al. |
| 8,339,747 B1 | 12/2012 | Hales et al. |
| 8,339,748 B2 | 12/2012 | Shum et al. |
| 8,343,363 B1 | 1/2013 | Pakpum et al. |
| 8,345,519 B1 | 1/2013 | Pan |
| 8,418,353 B1 | 4/2013 | Moravec et al. |
| 8,441,896 B2 | 5/2013 | Wang et al. |
| 8,446,694 B1 | 5/2013 | Tian et al. |
| 8,456,643 B2 | 6/2013 | Prabhakaran et al. |
| 8,456,776 B1 | 6/2013 | Pan |
| 8,462,462 B1 | 6/2013 | Moravec et al. |
| 8,477,459 B1 | 7/2013 | Pan |
| 8,480,066 B2 | 7/2013 | Anderson et al. |
| 8,485,579 B2 | 7/2013 | Roajanasiri et al. |
| 8,488,279 B1 | 7/2013 | Pan et al. |
| 8,488,281 B1 | 7/2013 | Pan |
| 8,490,211 B1 | 7/2013 | Leary |
| 8,514,522 B1 | 8/2013 | Pan et al. |
| 8,533,936 B1 | 9/2013 | Puttichaem et al. |
| 8,545,164 B2 | 10/2013 | Choumwong et al. |
| 8,553,365 B1 | 10/2013 | Shapiro et al. |
| 8,587,901 B1 | 11/2013 | Puttichaem et al. |
| 8,593,764 B1 | 11/2013 | Tian et al. |
| 8,599,653 B1 | 12/2013 | Mallary et al. |
| 8,605,389 B1 | 12/2013 | Pan et al. |
| 8,611,050 B1 | 12/2013 | Moravec et al. |
| 8,611,052 B1 | 12/2013 | Pan et al. |
| 8,623,197 B1 | 1/2014 | Kobsiriphat et al. |
| 8,624,184 B1 | 1/2014 | Souza et al. |
| 8,665,566 B1 | 3/2014 | Pan et al. |
| 8,665,567 B2 | 3/2014 | Shum et al. |
| 8,665,677 B1 | 3/2014 | Panitchakan et al. |
| 8,665,690 B1 | 3/2014 | Moravec et al. |
| 8,693,144 B1 | 4/2014 | Pan et al. |
| 8,756,795 B1 | 6/2014 | Moravec et al. |
| 8,758,083 B1 | 6/2014 | Rudy et al. |
| 8,760,812 B1 | 6/2014 | Chen et al. |
| 8,770,463 B1 | 7/2014 | Puttichaem et al. |
| 8,773,664 B1 | 7/2014 | Wang et al. |
| 8,792,212 B1 | 7/2014 | Pan et al. |
| 8,792,213 B1 | 7/2014 | Vijay et al. |
| 8,797,691 B1 | 8/2014 | Tian et al. |
| 2001/0054225 A1 * | 12/2001 | Mita et al. .................. 29/603.02 |
| 2002/0179696 A1 * | 12/2002 | Pattanaik et al. ............. 228/246 |
| 2006/0065700 A1 * | 3/2006 | Koh ......................... 228/180.21 |
| 2007/0075056 A1 * | 4/2007 | Ho et al. .................. 219/121.66 |
| 2007/0102485 A1 * | 5/2007 | Fukaya et al. ................ 228/101 |
| 2008/0002304 A1 * | 1/2008 | Yao et al. ..................... 360/294.4 |
| 2008/0130175 A1 * | 6/2008 | Jeong et al. ..................... 360/245 |
| 2010/0089981 A1 | 4/2010 | Matsumoto et al. |
| 2010/0091409 A1 * | 4/2010 | Chang et al. ............... 360/245.3 |
| 2011/0194210 A1 * | 8/2011 | Lee et al. .................... 360/256.2 |
| 2012/0069469 A1 | 3/2012 | Chiang et al. |
| 2012/0096705 A1 | 4/2012 | Jiang et al. |
| 2013/0244541 A1 | 9/2013 | Yaemglin et al. |
| 2013/0256281 A1 * | 10/2013 | Tsuchiya et al. ......... 219/121.64 |
| 2013/0293982 A1 | 11/2013 | Huber |
| 2014/0198411 A1 * | 7/2014 | Peng et al. .................. 360/234.5 |

OTHER PUBLICATIONS

Notice of Allowance dated Mar. 3, 2014 from U.S. Appl. No. 13/898,262, 8 pages.

Office Action dated Nov. 15, 2013 from U.S. Appl. No. 13/898,262, 11 pages.

* cited by examiner

HEAD GIMBAL ASSEMBLY CARRIER WITH ADJUSTABLE PROTECTIVE BAR

This application is a divisional of application Ser. No. 13/898,262 filed on May 20, 2013, now U.S. Pat. No. 8,770,463, which is hereby incorporated by reference.

TECHNICAL FIELD

This disclosure relates to the field of hard disk component fabrication and more specifically, to head gimbal assembly fabrication.

BACKGROUND

In an energy-assisted magnetic recording (EAMR) system, a small spot where data is to be written is locally heated to reduce the coercivity of the magnetic grains therein for the duration of the write operation, thereby allowing materials with increased magnetic anisotropy to be used, and greater areal storage density to be exploited.

A disk head gimbal assembly (HGA) for an EAMR system includes a suspension that holds a slider with a transducer and a flex cable assembly coupled to the slider. For EAMR applications, the HGA further includes a sub-mount coupled to a heat sink coupled to the suspension. The sub-mount comprises a near field transducer (NFT) to concentrate optical energy in the near field to dimensions smaller than the diffraction limit. The HGA further includes a laser diode coupled to the sub-mount and the suspension.

Solder jet bonding may be used during fabrication of EAMR HGAs. Typically, access to multiple sides of the HGA is needed to bond all the EAMR components. For example, access to the trailing edge of the slider may be needed for connecting the flex cable assembly to the slider and access to the back side of the HGA may be needed for connecting the sub-mount to a heat sink and connecting the laser diode to the sub-mount.

FIGS. 1A and 1B illustrates a conventional carrier 100 for fabricating HGAs 104. The carrier 100 comprises a non-adjustable bar 101 and a row of mounting locations 102—for example, a row of pins that fit in holes in the suspensions of HGAs 104. A clamp bar 103 retains and aligns the HGAs 104 on mounting locations 102.

BRIEF DESCRIPTION OF THE DRAWINGS

The present invention is illustrated by way of example, and not limitation, in the figures of the accompanying drawings in which.

DETAILED DESCRIPTION

Figure 1A:
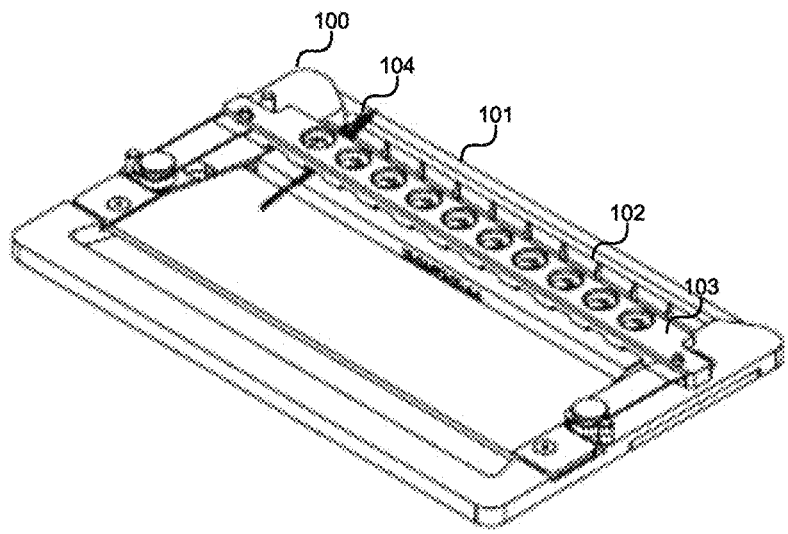
FIGS. 1A and 1B illustrate view of a prior art head gimbal assembly (HGA) carrier.
Figure 1B:
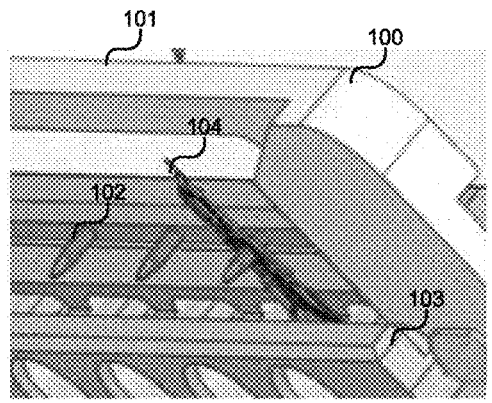

In the following description, numerous specific details are set forth to provide a thorough understanding of various embodiment of the present invention. It will be apparent however, to one skilled in the art that these specific details need not be employed to practice various embodiments of the present invention. In other instances, well known components or methods have not been described in detail to avoid unnecessarily obscuring various embodiments of the present invention.

The terms "leading" and "trailing" refer to the direction of flight of the slider. The term "bottom" refers to the side of a head gimbal assembly (HGA) that is opposite the air bearing surface (ABS). The term "top" refers to the side of an HGA that the ABS is disposed on.

FIGS. 2A-2K illustrate a head gimbal assembly carrier with an adjustable protective bar. The carrier comprises a body 200 having a plurality of mounting members 203, and an adjustable protective bar 205 that is movable between a first position (e.g., FIG. 2B) and a second position (e.g., 2H).

In the illustrated embodiment, the mounting members 203 comprise a plurality of pins 203 coupled to a mounting bar 208. The pins 203 fit within holes 226 in a suspension of an HGA 225 (FIG. 2G). A clamping bar 201 is attached to the body (for example, using a pneumatic hinge 202) and clamps the HGAs 225 to the carrier. The clamp bar includes a plurality of clamping locations 204 the clamping locations hold the HGAs 225 at corresponding alignment receptacles (not shown) on the body 200.

The adjustable protective bar 205 is coupled to a pair of adjustment mechanisms 210 and 209. The adjustments mechanisms 210 and 209 are operated simultaneously, either automatically or manually, to move the adjustable protective bar 205 from the first position to the second position, and back to the first position.

Figure 2A:
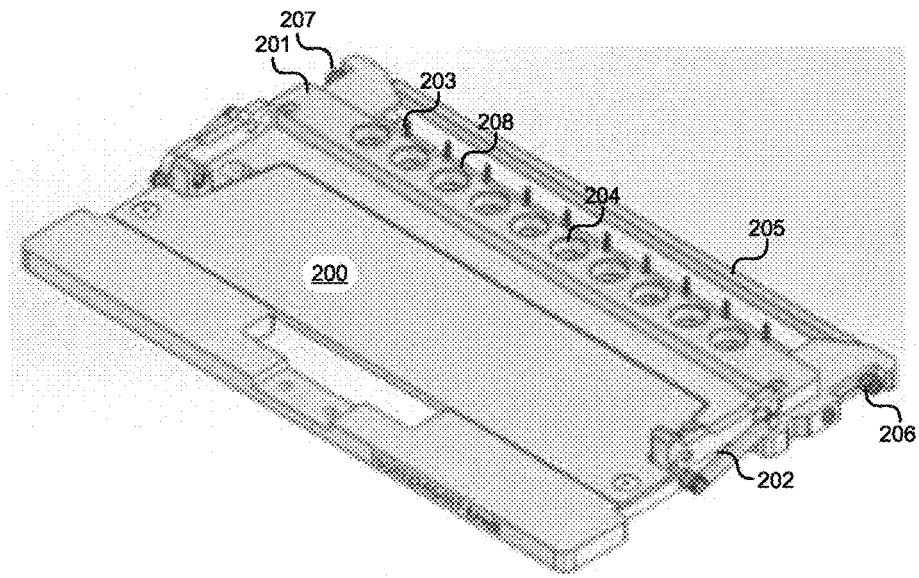
FIGS. 2A-2K illustrate an HGA carrier with adjustable protective bar.
Figure 2B:
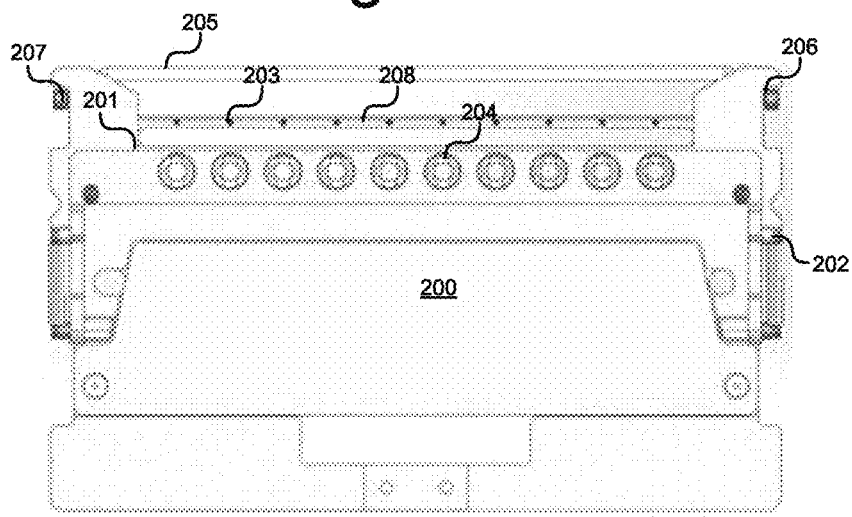
Figure 2C:
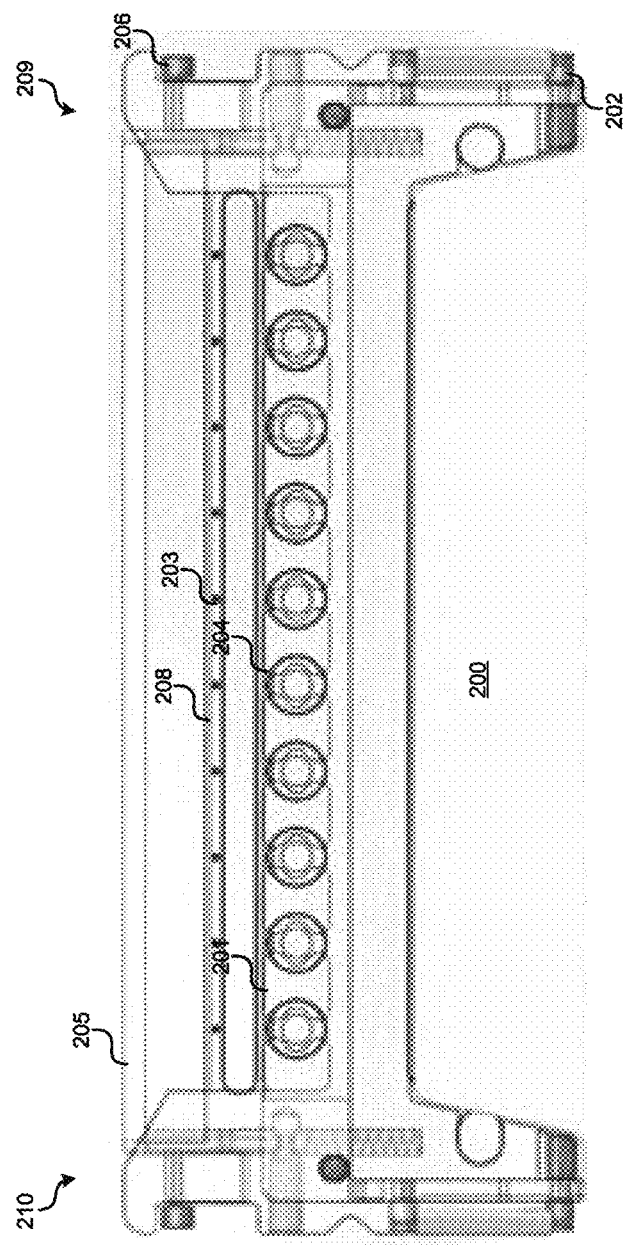
Figure 2D:
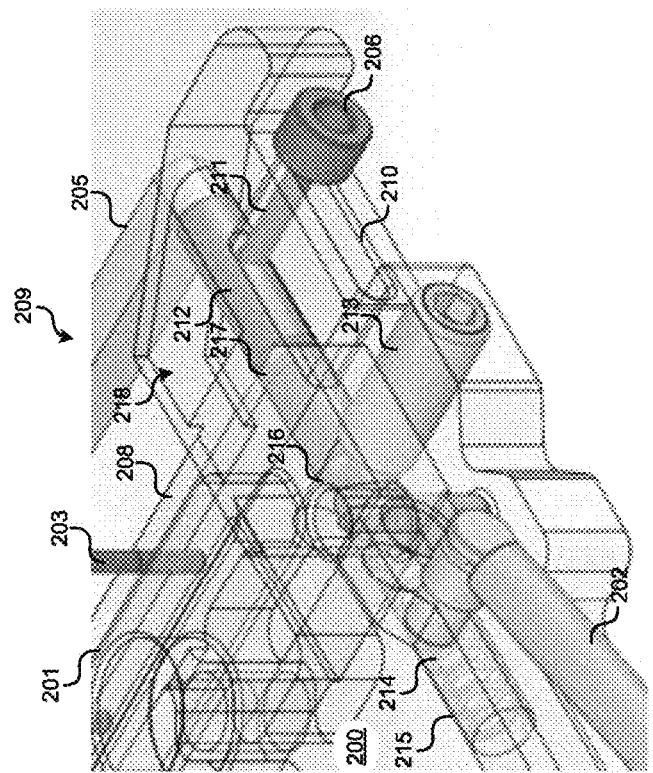
Figure 2E:
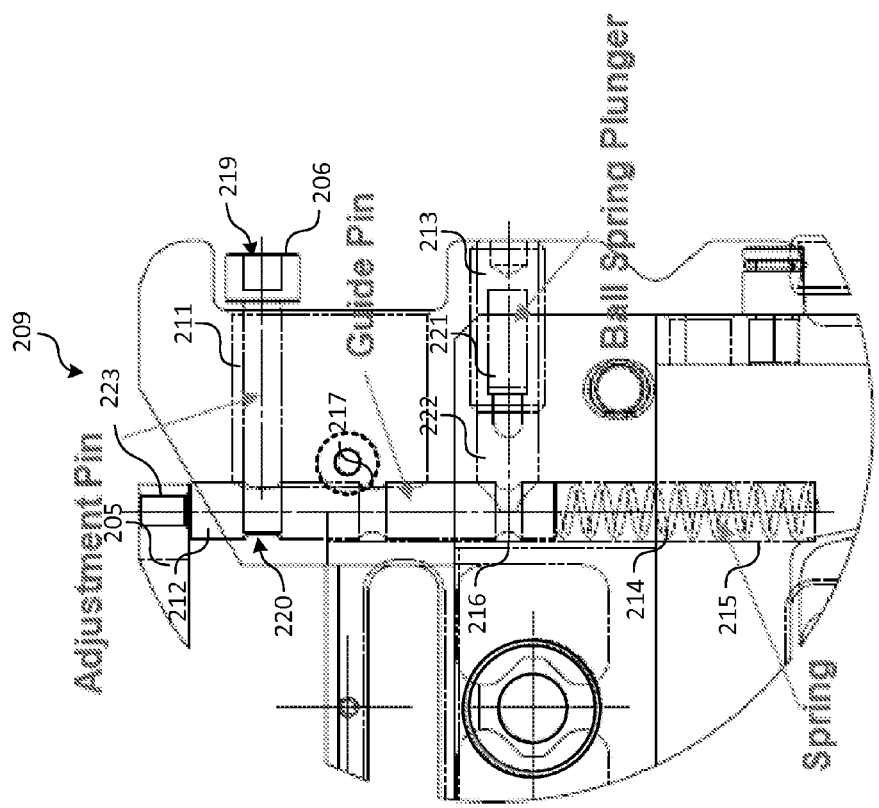
Figure 2G:
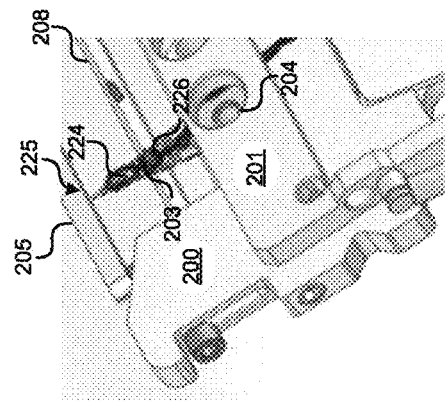

FIGS. 2D and 2E illustrate adjustment mechanism 209. In the illustrated embodiment, the adjustment mechanism 210 comprises structures equivalent to the adjustment mechanism 209. the adjustment mechanism 209 comprises a guide pin hole 215 in the body 200. A guide pin 212 is coupled (for example, using a bolt 223) to the adjustable bar 205 and slides within the guide pin hole 215. A spring 214 is disposed in the bottom of the guide pin hole 215. The spring 214 contacts the guide pin 212 and biases the guide pin 212 in the extended position.

The adjustment mechanism 209 further comprises an adjustment pin 206. The adjustment pin 206 is coupled to the guide pin 212 at location 220. In one embodiment, the adjustment pin 206 is bonded to the guide pin 212. For example, the distal end of the guide pin shaft 211 may be threaded and may screw into corresponding threads in hole 220. In another embodiment, the adjustment pin 206 is coupled to the guide pin 212 in a manner allowing the adjustment pin 206 to be slightly pulled out from the guide pin 212. For example, the adjustment pin 206 may slide through a hole 220 in the guide pin 212, such that a tip of the adjustment pin 206 interfaces with a socket in the hole 215 to lock the guide bar 205 in the first or second position. To unlock the guide bar 205 from the first or second position, the adjustment pin 206 is pulled from the socket.

The adjustment pin 206 further comprises a socket 219 at its outer terminus. The socket 219 may provide an interface for an automated system to move the protective bar 205 from the first position to the second position and vice versa.

The adjustment pin 206 slides in a slot 210 that extends through the body 200 of the carrier. Sliding the adjustment pin 206 within the slot 210 moves the protective bar 205 from the first position to the second position and back. Additionally, a groove 218 in the body 200 of the carrier provides room for the protective bar 205 to slide into.

The adjustment mechanism 209 further comprises a locking mechanism. In the illustrated embodiment, the locking mechanism comprises a pair of indents 216, 217 on the guide pin 212 and a ball spring plunger 213 coupled to the body 200. The ball spring plunger 213 comprises a plunger 222 coupled to a spring 221. When the protective bar 205 is in the first position, the plunger 222 interfaces with the first indent 216 to lock the bar 205 in place. When the adjustment pin 206 is moved with sufficient force, the spring force of spring 221 is overcome and the plunger 222 is pushed out of the indent 216, unlocking the bar 205. When the protective bar 205 is moved into the second position, the plunger 222 interfaces with the second indent 217 to releasably lock the protective bar 205 in the second position.

Figure 2F:
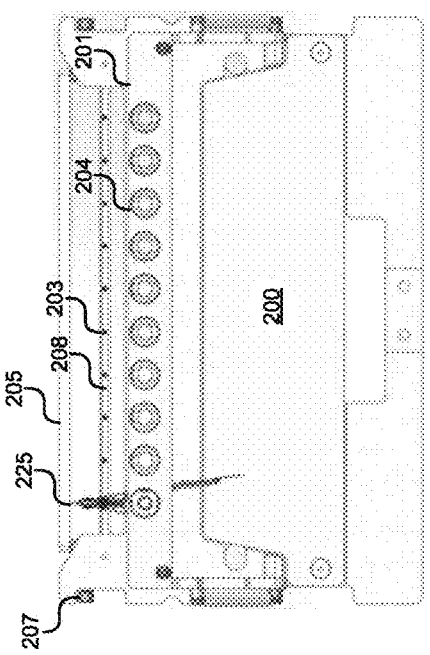

FIGS. 2F and 2G illustrate the HGA carrier assembly holding an HGA with the protective bar in the first position. While in the first position, the protective bar 205 extends beyond the leading tip of the HGA 225. In the first position, the protective bar 205 prevents deformation, e.g., flexure bending, of mounting members 203 due to handling. Additionally, the protective bar 205 provides access to the top side 224 of the HGA for soldering. For example, during manufacturing, the trailing edge pads of the HGA 225 may be soldered. In a particular embodiment, the trailing edge pads are solder jet bonded while the protective bar 205 is in the first position.

Figure 2I:
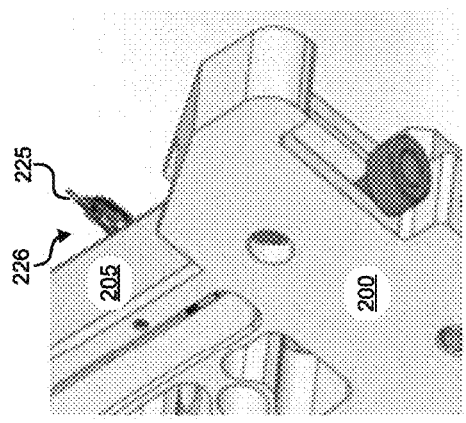
Figure 2H:
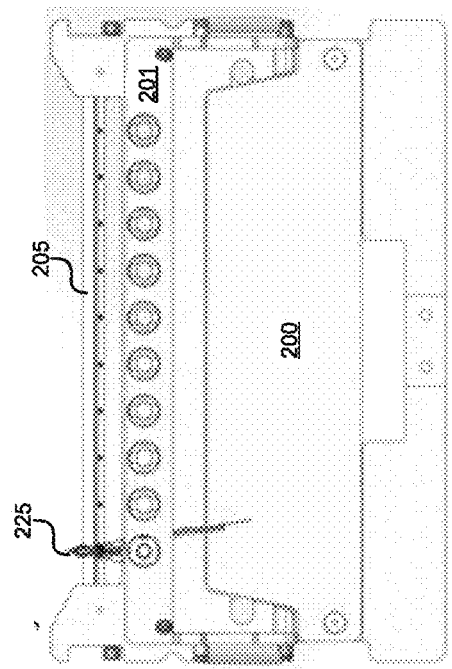
Figure 2K:
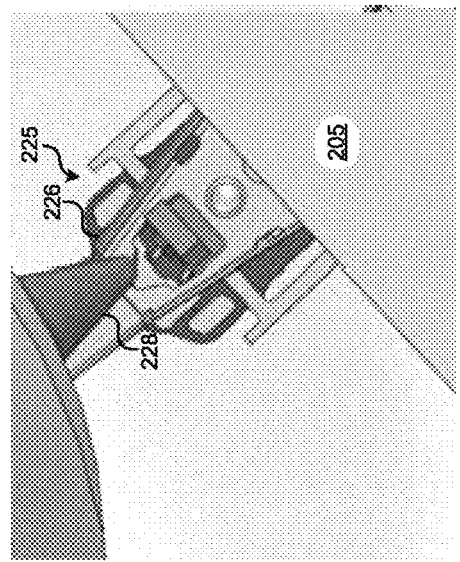
Figure 2J:
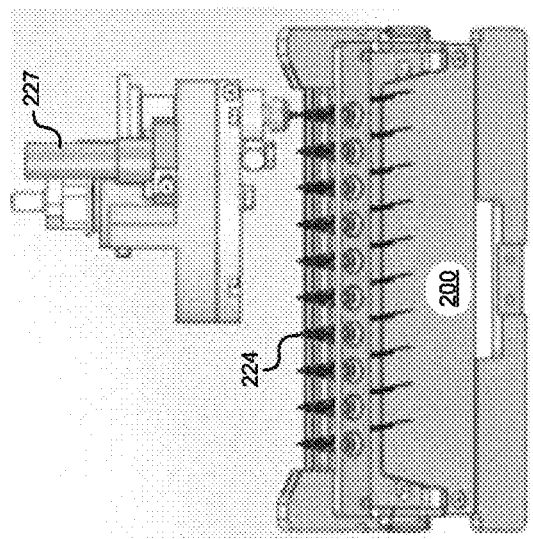

FIGS. 2H and 2I illustrate the HGA carrier assembly holding an HGA with the protective bar in the second position. In the second position, the protective bar 205 is retracted such that the HGA 225 extends beyond the distal edge of the protective bar 205. In the second position, the protective bar 205 provides access to the underside 226 of the HGA 225. The protective bar 205 may be placed into the second position to allow access for soldering components of the HGA or for inspection. For example, FIGS. 2J and 2K illustrate use of the protective bar 205 in the second position for solder jet bonding. The solder jet bonding machine 227 has access to the underside 226 of HGA 225 so the solder jet bonding machine capillary 228 can reach the bond Z-height target (for example, 150-250 microns). For example, in an EAMR HGA 225, underside 226 solder jet bonding may comprise bonding the sub-mount and laser diode pads of an HGA 225. After finishing solder and inspection, the adjustment pins 206, 207 are used to return the protective bar 205 to the extended, first position.

In the foregoing specification, embodiments of the invention have been described with reference to specific exemplary features thereof. It will, however, be evident that various modifications and changes may be made thereto without departing from the broader spirit and scope of the invention as set forth in the appended claims. The specification and figures are, accordingly, to be regarded in an illustrative rather than a restrictive sense.

What is claimed is:

1. A method, comprising:
    soldering a first component on a head gimbal assembly (HGA) while the HGA is mounted on an HGA mounting member and while a protective carrier bar of an HGA carrier is in a first position;
    moving the protective carrier bar to a second position; and
    soldering a second component on the HGA while the protective carrier bar is in the second position.

2. The method of claim 1, wherein, in the first position, the protective carrier bar is in front of the HGA.

3. The method of claim 2, wherein, in the second position, the protective carrier bar is behind the HGA.

4. The method of claim 1, wherein the first component is soldered to a first side of the HGA and the second component is soldered to a second side of the HGA.

5. The method of claim 1, further comprising:
    inspecting the soldered second component while the protective carrier bar is in the second position.

6. The method of claim 1, wherein the step of moving the protective carrier bar to the second position comprises sliding a guide pin coupled to the protective carrier bar using an adjustment pin coupled to the guide pin.

7. The method of claim 6, further comprising releasably retaining the protective carrier bar in the second position using a retainer.

8. The method of claim 7, wherein the retainer comprises a spring ball plunger.

* * * * *